(12) United States Patent
Khdary et al.

(10) Patent No.: US 10,774,095 B2
(45) Date of Patent: Sep. 15, 2020

(54) METHOD OF SYNTHESIZING METAL-ASCORBIC ACID CRYSTALS

(71) Applicant: The King Abdulaziz City for Science and Technology, Riyadh (SA)

(72) Inventors: Nezar Hassan Khdary, Riyadh (SA); Abdulaziz Almalik, Riyadh (SA)

(73) Assignee: THE KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 14/963,897

(22) Filed: Dec. 9, 2015

(65) Prior Publication Data

US 2020/0231603 A1 Jul. 23, 2020

(51) Int. Cl.
*C07F 1/08* (2006.01)
(52) U.S. Cl.
CPC .................... *C07F 1/08* (2013.01)
(58) Field of Classification Search
CPC ....................................... C07F 1/08
USPC .......................................... 549/206
See application file for complete search history.

(56) References Cited

PUBLICATIONS

Zumreoglu-Karan, Coordination Chem. Rev. (2006), vol. 250, pp. 2295-2307.*
Sultan et al., Ibn Al-Haitham J. Pure and Applied Sci. (2012), vol. 25(1), pp. 1-27.*

* cited by examiner

*Primary Examiner* — Taofiq A Solola
(74) *Attorney, Agent, or Firm* — Steven M. Shape; Dennemeyer & Associates, LLC

(57) ABSTRACT

The invention provides metal-ascorbic acid crystals and a method for synthesizing the metal-ascorbic acid crystals. The metal in the metal-ascorbic acid crystals is one of copper (Cu), gold (Au) and silver (Ag). The method for synthesizing the metal-ascorbic acid crystals includes sonicating a solution of ascorbic acid and a solvent in dark to obtain a clear solution, wherein the solvent is one of dimethylformamide (DMF) and dimethyl sulfoxide (DMSO). A metal salt is added to the clear solution, wherein the metal salt is one of copper (II) sulfate pentahydrate ($CuSO_4.5H_2O$), gold (III)-chloride ($AuCl_3$), and silver sulfate ($Ag_2SO_4$). The clear solution is sonicated after adding the metal salt to obtain a reaction mixture. Thereafter, the reaction mixture is heated in dark. The reaction mixture is treated to facilitate solvent extraction of the metal-ascorbic acid. Finally, the metal-ascorbic acid is crystallized.

8 Claims, 6 Drawing Sheets

METHOD OF SYNTHESIZING METAL-ASCORBIC ACID CRYSTALS

FIELD OF THE INVENTION

The invention generally relates to the field of drug for treating tumors. More specifically, the invention relates to metal-ascorbic acid crystals and a method for synthesizing the metal-ascorbic acid crystals.

BACKGROUND OF THE INVENTION

Generally, different heavy metal complexes are used for treating cancer patients. However, in most chemotherapy treatments, normal cells of a patient are affected along with cancerous cells. For example, cis-platinum complex is used for chemotherapy. Cis-platinum complex leads to number of side effects such as, but not limited to, unusual bleeding or bruising, blood in urine and stool, joint pain, ringing ears, loss of balance, and loss of taste. Thus, cis-platinum complex is toxic to the normal cells along with the cancerous cells.

Thus, there is a need for an improved drug for cancer treatment which is non-toxic to normal cells and selectively targets only the cancerous cells in cancer patients.

BRIEF DESCRIPTION OF THE FIGURES

The accompanying figures together with the detailed description below forms part of the specification and serves to further illustrate various embodiments and to explain various principles and advantages all in accordance with the invention.

DETAILED DESCRIPTION OF THE INVENTION

Before describing in detail embodiments that are in accordance with the invention, it should be observed that the embodiments reside primarily in metal-ascorbic acid crystals and a method for synthesizing the metal-ascorbic acid crystals which are used for tumor treatment.

In this document, terms "comprises," "comprising," or any other variation thereof, are intended to cover a non-exclusive inclusion, such that a process, method, or composition that comprises a list of elements does not include only those elements but may include other elements not expressly listed or inherent to such process, method, or composition. An element proceeded by "comprises . . . a" does not, without more constraints, preclude the existence of additional identical elements in the process, method, or composition that comprises the element.

Generally speaking, pursuant to various embodiments, the invention provides metal-ascorbic acid crystals and a method for synthesizing the metal-ascorbic acid crystals. The metal in the metal-ascorbic acid is one of copper (Cu), gold (Au) and silver (Ag). The method for synthesizing the metal-ascorbic acid crystals includes sonicating a solution of ascorbic acid and a solvent in dark to obtain a clear solution, wherein the solvent is one of dimethylformamide (DMF) and dimethyl Sulfoxide (DMSO). A metal salt is added to the clear solution, wherein the metal salt is one of copper (II) sulfate pentahydrate ($CuSO_4.5H_2O$), gold (III)-chloride ($AuCl_3$), and silver sulfate ($Ag_2SO_4$). The clear solution is sonicated after adding the metal salt to obtain a reaction mixture. Thereafter, the reaction mixture is heated in dark. The reaction mixture is treated to facilitate solvent extraction of the metal-ascorbic acid. Finally, the metal-ascorbic acid is crystallized.

Figure 1:
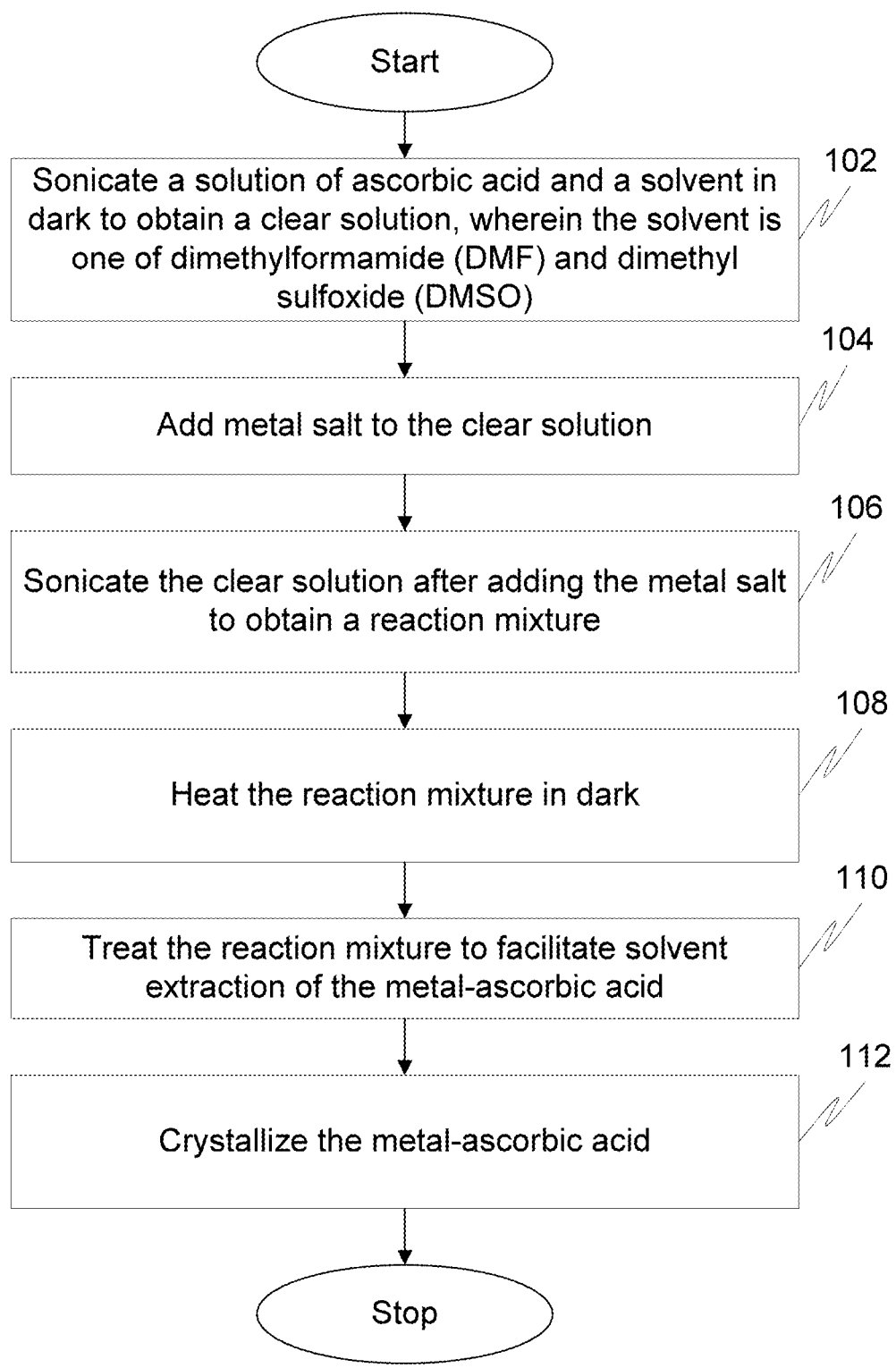
FIG. 1 illustrates a flow diagram of a method for synthesizing metal-ascorbic acid crystals in accordance with the embodiments of the invention.

FIG. 1 illustrates a flow diagram of a method for synthesizing metal-ascorbic acid crystals in accordance with the embodiments of the invention.

At step 102, a solution of ascorbic acid and a solvent is sonicated in dark to obtain a clear solution, wherein the solvent is one of dimethylformamide (DMF) and dimethyl sulfoxide (DMSO). In an embodiment, the solution of ascorbic acid and DMF is prepared by adding ascorbic acid in DMF in dark. The solution of ascorbic acid and DMF is sonicated till ascorbic acid is completely dissolved. In an embodiment, the solution of ascorbic acid and DMF is sonicated for a time period of about 3 minutes to about 10 minutes.

At step 104, metal salt is added to the clear solution, wherein the metal salt is one of copper (II) sulfate pentahydrate ($CuSO_4.5H_2O$), gold (III)-chloride ($AuCl_3$), and silver sulfate ($Ag_2SO_4$). The clear solution after adding the metal salt is sonicated till the metal salt is completely dissolved. In an embodiment, the clear solution after adding the metal salt is sonicated for a time period of about 3 minutes to about 10 minutes.

At step 106, the clear solution is sonicated after adding the metal salt to obtain a reaction mixture. The clear solution is sonicated after adding the metal salt until the reaction mixture becomes transparent. Thus, a clear reaction mixture is obtained.

Thereafter, at step 108, the reaction mixture is heated in dark. In an embodiment, the reaction mixture is heated in dark using one of an oil bath and an oven. Step 108 is elaborated in conjunction with FIG. 2. The reaction mixture is allowed to cool down to room temperature after heating the reaction mixture.

At step 110, the reaction mixture is treated to facilitate solvent extraction of the metal-ascorbic acid. Step 110 is elaborated in conjunction with FIG. 3.

Finally, at step 112, the metal-ascorbic acid is crystallized. In an embodiment, the metal-ascorbic acid is crystallized by allowing the metal-ascorbic acid to remain at room temperature for a period of 5 to 10 days.

The metal-ascorbic acid is used for treating tumors. The metal-ascorbic acid is used, more specifically, for treating liver cancer and prostate cancer.

Figure 2:
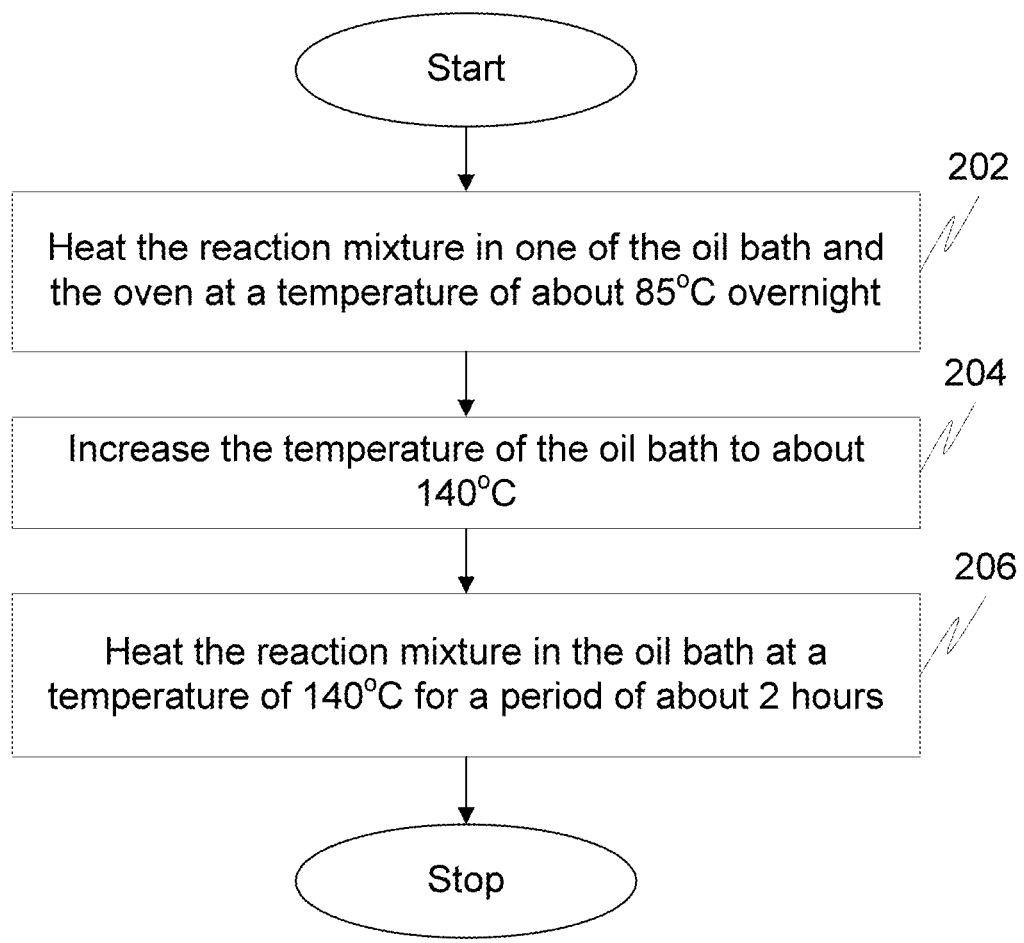
FIG. 2 illustrates a flow diagram of a method of heating of a reaction mixture in dark using one of an oil bath and an oven in accordance with the embodiments of the invention.

FIG. 2 illustrates a flow diagram of a method of heating of the reaction mixture in dark using one of the oil bath and the oven in accordance with the embodiments of the invention.

At step 202, the reaction mixture is heated in one of the oil bath and the oven at a temperature of about 85° C. overnight.

At step 204, the temperature of the oil bath is increased from 85° C. to about 140° C.

At step 206, the reaction mixture is heated at a temperature of 140° C. for a period of about 2 hours.

Figure 3:
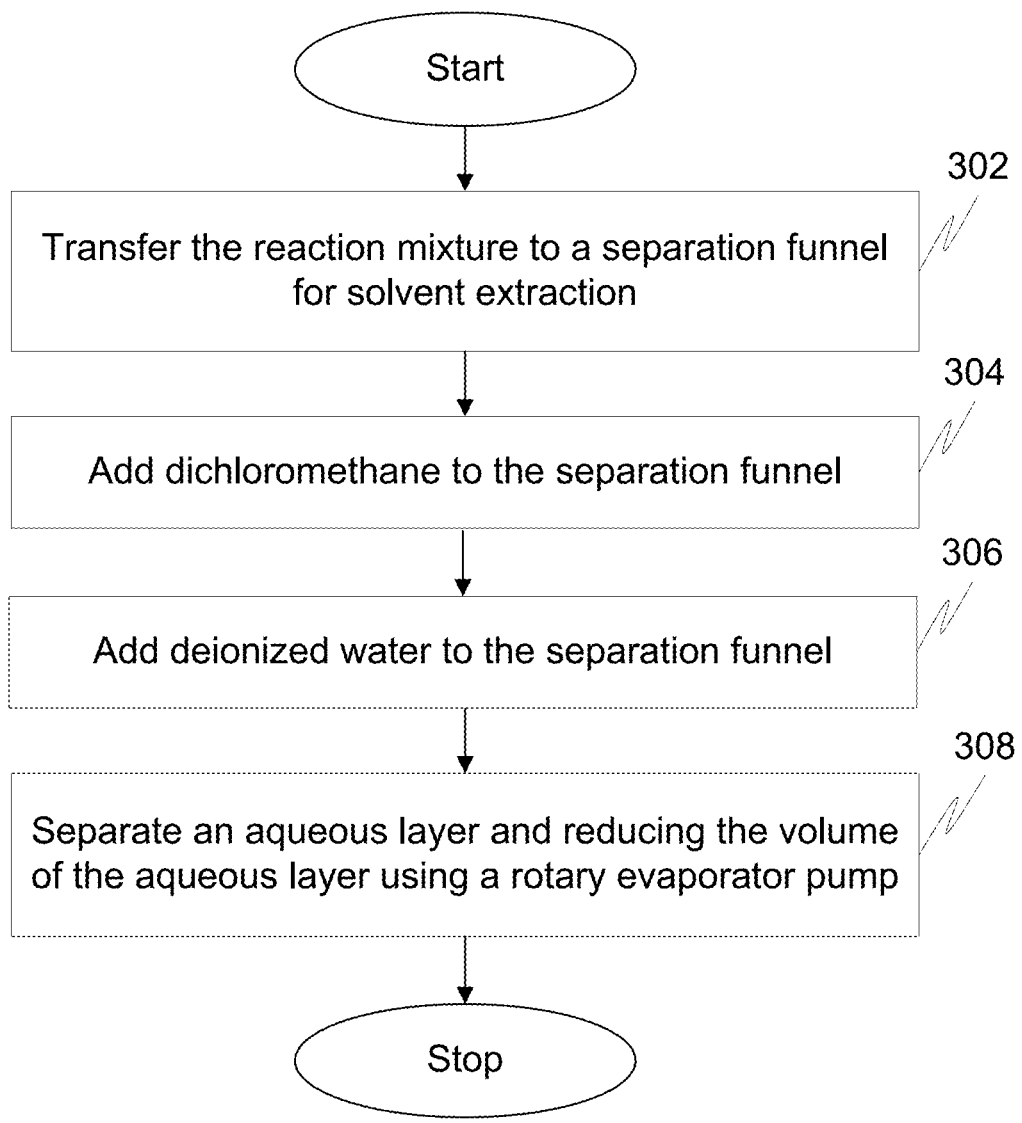
FIG. 3 illustrates a flow diagram of a method of treating of a reaction mixture to facilitate solvent extraction of metal-ascorbic acid in accordance with the embodiments of the invention.

FIG. 3 illustrates a flow diagram of a method of treating of the reaction mixture to facilitate solvent extraction of the metal-ascorbic acid in accordance with the embodiments of the invention.

At step 302, the reaction mixture is transferred to a separation funnel for solvent extraction.

At step 304, dichloromethane is added to the separation funnel.

At step 306, deionized water is added to the separation funnel.

At step 308, an aqueous layer is separated and the volume of the aqueous layer is reduced using a rotary evaporator pump.

Synthesis of Cu-Ascorbic Acid Crystals

Working Example

In this working example, a weight of L-ascorbic acid was added to 100 milliliter (ml) of dimethylforamide (DMF) in a dark reaction vessel to obtain a solution. The solution is sonicated for a period of about 5 minutes until the ascorbic acid is completely dissolved in DMF to obtain a clear solution. A weight of copper (II) sulfate pentahydrate ($CuSO_4.5H_2O$) is added to the clear solution and sonicated for a period of about 5 minutes until a transparent reaction mixture is obtained. A vial of the reaction mixture is placed in an oil bath that is at the temperature of 85° C. The vial is kept in the oil bath at the temperature of 85° C. overnight and thereafter, the temperature is increased to the temperature of 140° C. The vial is kept the temperature of at 140° C. in the oil bath for a period of about 2 hours. After heating the reaction mixture for about 2 hours, the reaction mixture is allowed to cool down to the room temperature. After cooling, the reaction mixture is transferred to a separation funnel for solvent extraction. 20 ml of dicloromethane is added to the separation funnel which is followed by 10 ml of deionized water. Thereafter, an aqueous layer is separated and taken to a rotary evaporator pump to reduce the volume of the aqueous layer. Finally, a product is formed that is kept in the room temperature for several days to form crystals. The crystals are characterized and assessed.

Figure 4:
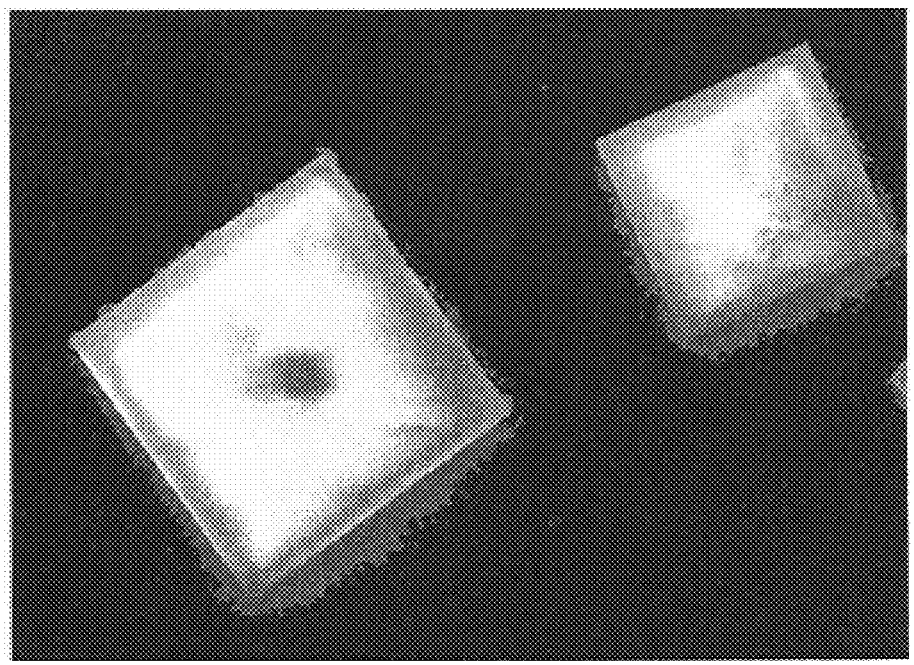
FIG. 4 depicts admirable stability of Cu-ascorbic acid crystals under a scanning electron microscope.
Figure 5:
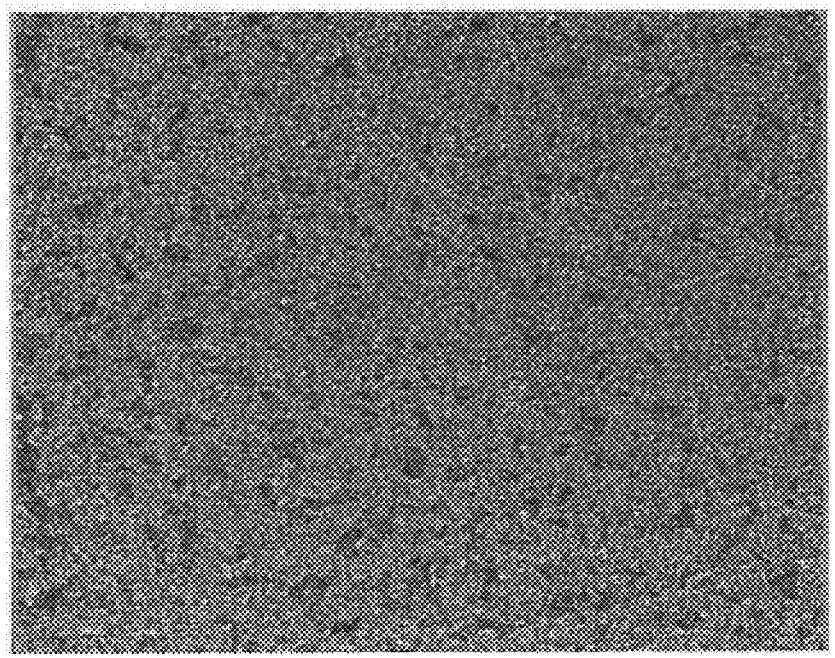
FIG. 5 depicts distribution of Cu-ascorbic acid (black dots) on an organic structure in a Transmission Electron Microscopy (TEM) image for the Cu-ascorbic acid crystals.
Figure 6:
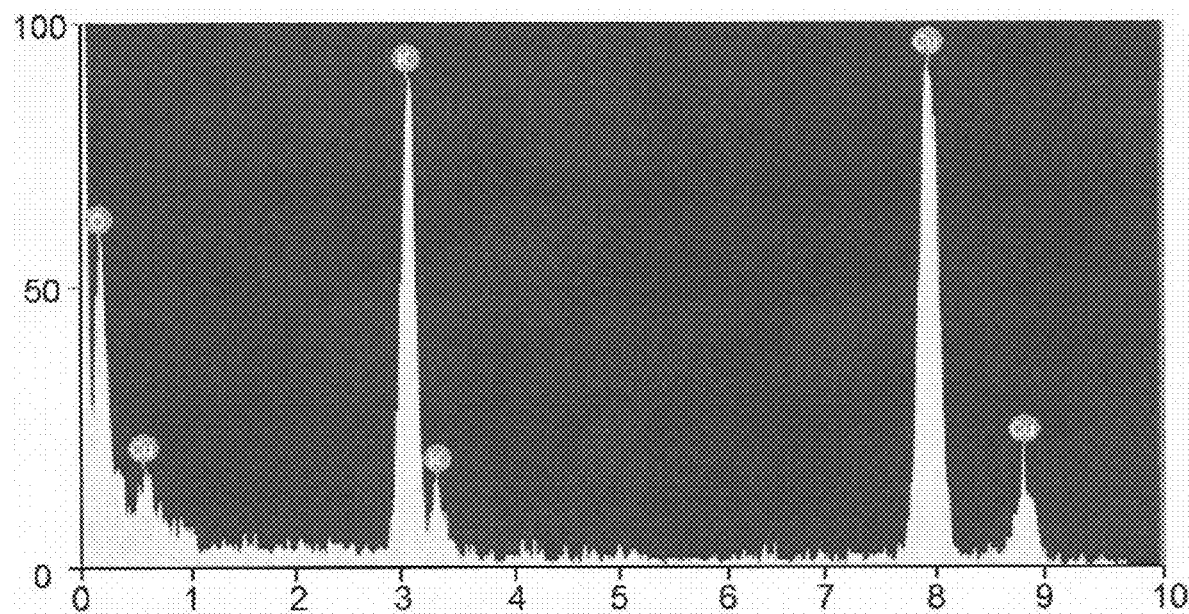
FIG. 6 depicts energy dispersive X-ray (EDX) for Cu-ascorbic acid crystals.

The characterization of the Cu-ascorbic acid crystals are depicts using FIGS. 4-6. FIG. 4 depicts admirable stability of crystals under a scanning electron microscope. FIG. 5 depicts distribution of Cu-ascorbic acid (black dots) on an organic structure in a Transmission Electron Microscopy (TEM) image for the Cu-ascorbic acid crystals. FIG. 6 depicts energy dispersive X-ray (EDX) for the Cu-ascorbic acid crystals. The presence of Cu is also confirmed by the EDX as shown in FIG. 6.

Figure 7:
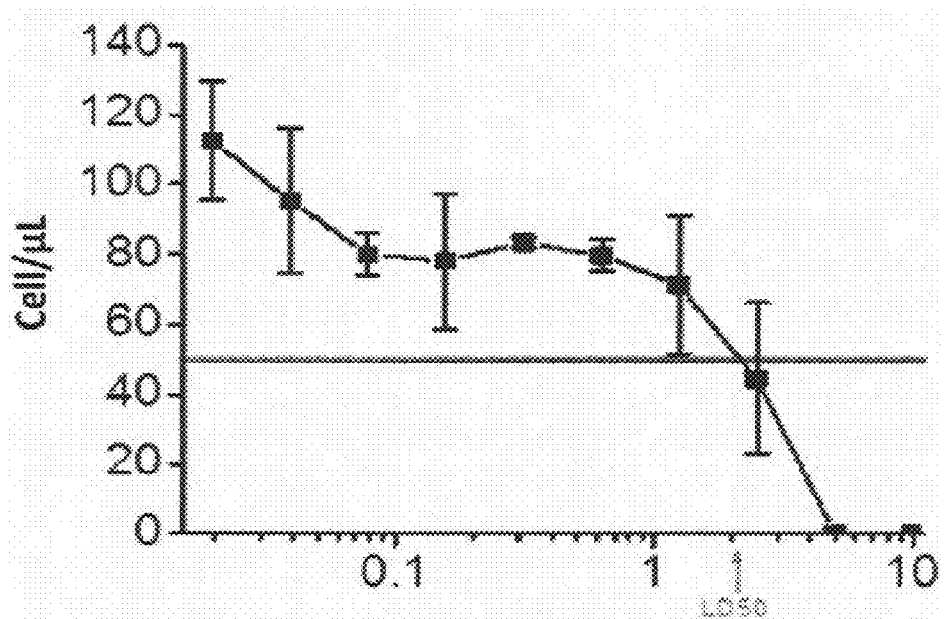
FIG. 7 represents a graph with average cell viability of human liver carcinoma cells incubated for 24 hours with Cu-ascorbic acid crystals as a function of concentration.
Figure 8:
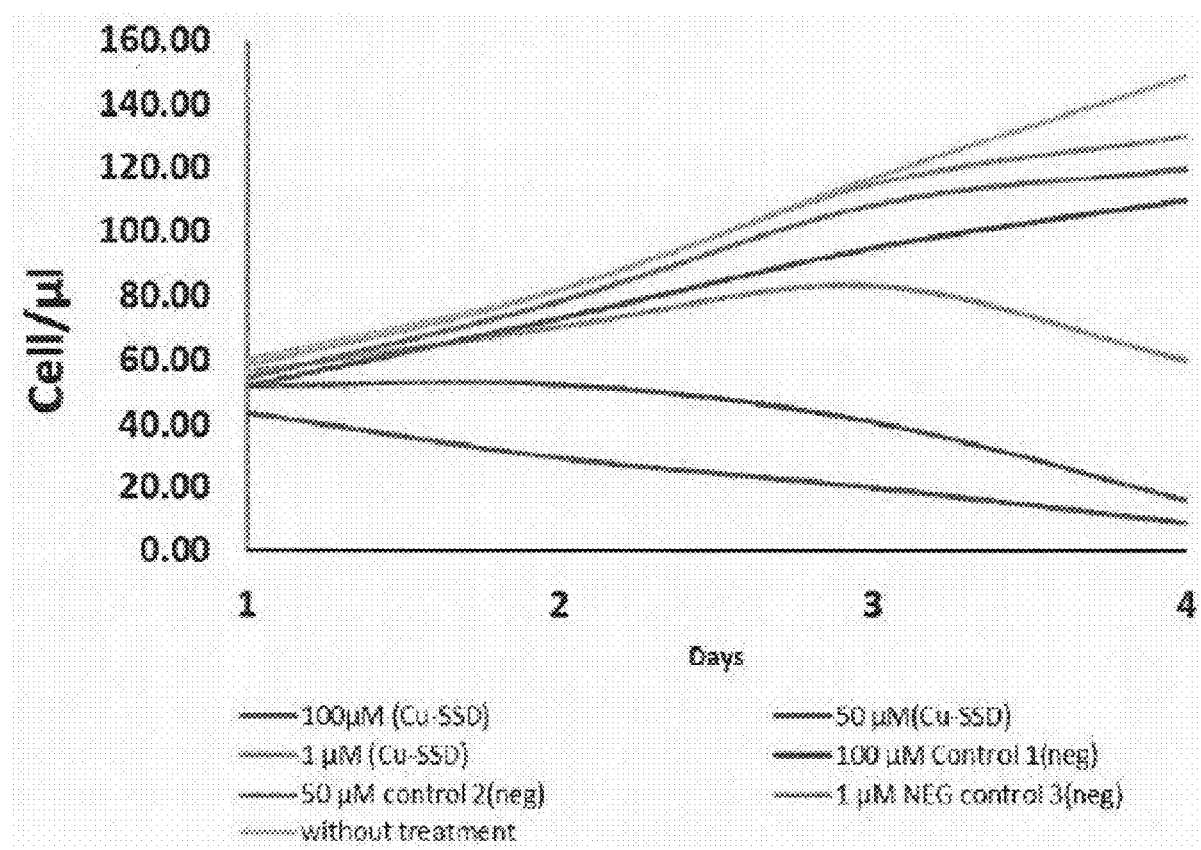
FIG. 8 represents a graph of average viability of human prostate cancer cells incubated for 4 days with Cu-ascorbic acid crystals as a function of concentration.

The Cu-ascorbic acid crystals is assessed as anti-tumor agent using two types of cell-lines which are, human liver carcinoma cell lines (Hep G2) and human prostate cancer cell lines (PC-3). FIG. 7 represents a graph with average cell viability of Hep G2 cells incubated for 24 hours with Cu-ascorbic acid crystals as a function of concentration. The effect of Cu-ascorbic acid crystals shows high activity to eradicate Hep G2 cells as shown in FIG. 7. The Cu-ascorbic acid crystals have a promising effect in eradicating PS-3 cells with 1-4 days. FIG. 8 represents a graph of average viability of PC-3 cells incubated for 4 days with Cu-ascorbic acid crystals as a function of concentration.

Various embodiments of the invention provide metal ascorbic acid crystals which shows strong influence as a cancer cell inhibitor and cancer cell eradicator. The metal ascorbic acid crystals are non-toxic to normal cells and can be targeted to a specific type of tumor cell. Relatively, the metal ascorbic acid crystals are prepared using inexpensive material. The metal ascorbic acid crystals can also be dissolved in water to obtain a very pure complex.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of synthesizing metal-ascorbic acid crystals, wherein the metal is one of copper (Cu), gold (Au) and silver (Ag), the method comprising:
   sonicating a solution of ascorbic acid and a solvent in the absence of light to obtain a clear solution, wherein the solvent is one of dimethylformamide (DMF) and dimethyl sulfoxide (DMSO);
   adding metal salt to the clear solution, wherein the metal salt is one of copper (II) sulfate pentahydrate ($CuSO_4.5H_2O$), gold (III)-chloride ($AuCl_3$), and silver sulfate (Ag2SO4);
   sonicating the clear solution after adding the metal salt to obtain a reaction mixture;
   heating the reaction mixture in the absence of light;
   treating the reaction mixture to facilitate solvent extraction of the metal-ascorbic acid, wherein treating the reaction mixture to facilitate solvent extraction of the metal-ascorbic acid comprises:
      transferring the reaction mixture to a separation funnel for solvent extraction;
      adding dichloromethane to the separation funnel;
      adding deionized water to the separation funnel; and
      separating an aqueous layer and reducing a volume of the aqueous layer using a rotary evaporator pump; and
   crystallizing the metal-ascorbic acid, wherein the metal-ascorbic acid is crystallized by allowing the metal-ascorbic acid to remain at room temperature for a period of 5 days to 10 days.

2. The method of claim 1, wherein the solution of ascorbic acid and the solvent is prepared by adding ascorbic acid in the solvent in the absence of light.

3. The method of claim 1, wherein the solution of ascorbic acid and the solvent is sonicated until the ascorbic acid is completely dissolved.

4. The method of claim 1, wherein the clear solution after adding the metal salt is sonicated until the metal salt is completely dissolved.

5. The method of claim 1, wherein the clear solution is sonicated after adding the metal salt until the reaction mixture becomes transparent.

6. The method of claim 1, wherein the reaction mixture is heated in the absence of light using one of an oil bath or an oven.

7. The method of claim 6, wherein heating the reaction mixture in the absence of light using one of the oil bath or the oven comprises:
   heating the reaction mixture in one of the oil bath or the oven at a temperature of 85° C. overnight;
   increasing the temperature to 140° C.; and
   heating the reaction mixture at a temperature of 140° C. for a period of 2 hours.

8. The method of claim 1, wherein the reaction mixture is allowed to cool to room temperature after heating the reaction mixture.

* * * * *